United States Patent
Lyu et al.

(10) Patent No.: US 12,193,006 B2
(45) Date of Patent: Jan. 7, 2025

(54) METHOD AND APPARATUS FOR ENHANCED SEMI-PERSISTENT SCHEDULING CONFIGURATION

(71) Applicants: Yongxia Lyu, Ottawa (CA); Liqing Zhang, Ottawa (CA); Jianglei Ma, Ottawa (CA)

(72) Inventors: Yongxia Lyu, Ottawa (CA); Liqing Zhang, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/939,905

(22) Filed: Jul. 27, 2020

(65) Prior Publication Data

US 2021/0037516 A1  Feb. 4, 2021

Related U.S. Application Data

(60) Provisional application No. 62/881,138, filed on Jul. 31, 2019.

(51) Int. Cl.
*H04L 1/1829* (2023.01)
*H04W 72/21* (2023.01)

(52) U.S. Cl.
CPC ........... *H04W 72/21* (2023.01); *H04L 1/1861* (2013.01)

(58) Field of Classification Search
CPC ........... H04W 72/0413; H04W 72/042; H04L 1/1861; H04L 1/1854
See application file for complete search history.

(56) References Cited

U.S. PATENT DOCUMENTS

| | | |
|---|---|---|
| 2013/0003577 A1 | 1/2013 | Gupta et al. |
| 2014/0185530 A1 | 7/2014 | Kuchibhotla et al. |
| 2015/0249974 A1 | 9/2015 | Lee et al. |
| 2018/0091280 A1* | 3/2018 | Kim ............ H04W 4/70 |
| 2018/0124753 A1 | 5/2018 | Sun et al. |
| 2019/0045489 A1 | 2/2019 | He et al. |

(Continued)

FOREIGN PATENT DOCUMENTS

EP  2166805 A1  3/2010

OTHER PUBLICATIONS

NEC, SPS Activation and Deactivations in NR. 3GPP TSG RAN WG1 Meeting AH 1801, Vancouver, Canada, Jan. 22-26, 2018, R1-1800538, 3 pages.

(Continued)

*Primary Examiner* — Bo Hui A Zhu (57) ABSTRACT

Systems and methods for configuring semi-persistent scheduling (SPS) transmission are disclosed. An example method performed by a wireless device includes: transmitting, to a user equipment, a radio resource control (RRC) signal comprising a time and frequency configuration for semi-persistent scheduling (SPS); and transmitting, to the user equipment, an information block via a physical downlink shared channel (PDSCH) configured based on the time and frequency configuration for SPS, the information block comprising signaling indicating at least one of: a modulation and coding scheme (MCS) for a subsequent transmission, a transmit power control command (TPC) for physical uplink control channel (PUCCH), PDSCH-to-HARQ feedback timing indicator, and PUCCH resource indicator.

23 Claims, 6 Drawing Sheets

| Bit 1 | Bit 2 | Bit 3 | Bit 4 | Bit 5 | Bit 6 | Bit 7 | Bit 8 |
|---|---|---|---|---|---|---|---|

400

| R 401 | Serving cell ID 402 | BWP ID 403 | Oct 1 |
|---|---|---|---|
| PUCCH resource indicator 410 | HARQ-ACK feedback timing 420 | DAI 430 | Oct 2 |
| DAI 430 | TPC 440 | ZP CSI RS 450 | SRS 460 | Oct 3 |

(56) References Cited

U.S. PATENT DOCUMENTS

| | | | | |
|---|---|---|---|---|
| 2020/0204289 A1* | 6/2020 | Yoshimoto | ............ | H04L 1/0025 |
| 2020/0351129 A1* | 11/2020 | Kwak | .................. | H04B 7/0695 |
| 2020/0396760 A1* | 12/2020 | Yi | .......................... | H04L 1/1864 |
| 2021/0028843 A1* | 1/2021 | Zhou | ...................... | H04B 7/063 |
| 2021/0321353 A1* | 10/2021 | Muruganathan | .. | H04W 72/0446 |

OTHER PUBLICATIONS

3rd Generation Partnership Project (3GPP), Technical Specification NR; Medium Access Control (MAC) Protocol Specification 38.321 V15.5.0, section 5.8 2019.

3rd Generation Partnership Project (3GPP), Technical Specification NR; Radio Resource Control (RRC); Protocol specification 38.331 V15.6.0, pp. 79-82 Jun. 2019.

3rd Generation Partnership Project (3GPP), Technical Specification NR; Radio Resource Control (RRC); Protocol specification 38.331 V16.0.0, pp. 350-356 Mar. 2020.

3rd Generation Partnership Project (3GPP), Technical Specification NR; Multiplexing and channel coding; Protocol specification 38.212 V15.5.0, section 7.3.1.1 and 7.3.1.2 (Mar. 2019) Mar. 2019.

3rd Generation Partnership Project (3GPP), Technical Specification NR; Physical layer procedures for control; Protocol specification 38.213 V15.5.0, section 10.2 (Mar. 2019) Mar. 2019.

3rd Generation Partnership Project (3GPP), Technical Specification NR; Physical layer procedures for data; Protocol specification 38.214 V15.5.0, section 5.1.2.1 (Mar. 2019) Mar. 2019.

* cited by examiner

| Bit 1 | Bit 2 | Bit 3 | Bit 4 | Bit 5 | Bit 6 | Bit 7 | Bit 8 |
|---|---|---|---|---|---|---|---|
| R 501 | | | Serving cell ID 502 | | | BWP ID 503 | |
| | | | Frequency domain allocation 504 | | | | |
| | | | Frequency domain allocation 504 | | | | |
| Frequency domain allocation 504 | | | | Time domain allocation 505 | | | |
| | MCS 506 | | | RV 507 | | | |
| Antenna port 508 | | | TCI 509 | | | Antenna port 508 | |
| PUCCH resource indicator 515 | | | HARQ-ACK feedback timing 520 | | | R PUCCH resource indicator 510 | |
| DAI 530 | | | TPC 540 | | ZP CSI RS 550 | | DAI 530 |
| | | | | | | | SRS 560 |

METHOD AND APPARATUS FOR ENHANCED SEMI-PERSISTENT SCHEDULING CONFIGURATION

CROSS-REFERENCE TO RELATED APPLICATIONS

This application claims priority to and the benefit of U.S. Provisional Patent Application No. 62/881,138 filed on Jul. 31, 2019, the content of which is herein incorporated by reference in its entirety.

FIELD

The present disclosure relates to methods and apparatuses for semi-persistent scheduling (SPS) configurations.

BACKGROUND

In some wireless communication systems, a user equipment (UE) wirelessly communicates with a base station to send electronic signals to the base station or to receive electronic signals from the base station. The electronic signals may contain data or messages. A wireless communication from a user equipment (UE) to a base station is referred to as an uplink communication or uplink transmission. A wireless communication from a base station to a UE is referred to as a downlink communication or downlink transmission. Communications between two UEs are sometimes referred to as sidelink communications.

Resources are required to perform uplink and downlink and sidelink communications. For example, a UE may wirelessly transmit data to a base station in an uplink transmission at a particular frequency, during a particular slot in time. The frequency and time slot used are examples of resources (sometimes referred to as time-frequency resources).

Some wireless communication systems may support grant-based uplink transmissions. That is, if a UE wants to transmit data to a base station, the UE first requests the appropriate uplink resources from the base station. Once the base station has granted the uplink resources, the UE sends the uplink transmission using the granted uplink resources. An example of uplink resources that may be granted by the base station is a set of time-frequency locations in an uplink orthogonal frequency-division multiple access (OFDMA) frame.

Some wireless communication systems may support configured grant (CG) uplink transmissions. That is, a UE may send uplink transmissions using certain uplink resources possibly shared with other UEs, without specifically requesting use of the resources and without specifically being granted the resources by the base station. A configured grant uplink transmission does not need a dynamic and explicit scheduling grant from the base station. A configured grant transmission is also sometimes known as a grant-free (GF) transmission.

A configured grant uplink transmission may be configured by radio resource control (RRC) signaling messages. The RRC signaling message may include parameters, including one or more one or more sets of parameters for one or more UEs in order to pre-configure a configured grant uplink transmission.

Emerging 5G (e.g., New Radio or "NR") technology may be adapted for Ultra-Reliable Low Latency Communication (URLLC) and massive Machine Type Communications (mMTC). For example, factory automation involving a large number of UEs per cell generally demands a combination of high reliability and low latency, i.e. URLLC, which relies on technologies specified in the 3rd Generation Partnership Project Technical Specification (3GPP TS) 38.331, and 3GPP TS38.321. In addition, Uplink (UL) configured grant (CG) transmission is specified in 3GPP TS 38.331 Release 15 ("R15") and referred to as configured grant type 1. UL SPS transmission is also specified in R15 and referred to as configured grant type 2.

Vehicle to everything (V2X) refers to a category of communications scenarios (along with their corresponding technical challenges), including communication between a vehicle and another vehicle (V2V), vehicle to infrastructure (V2I), vehicle to pedestrian (V2P), and many other scenarios. In a V2X scenario, the transmission can be done through a link between the network and a UE, such as uplink (UL) and downlink (DL), or a sidelink (SL) between one UE and another UE. UE cooperation can be used to enhance the reliability, throughput, and capacity of V2X communications, as well as next generation wireless communications in general. SPS transmissions and CG transmissions may take place over a sidelink, for example between two UEs. Channel conditions and other parameters may change over time, more quickly than they are updated by RRC signaling, potentially causing a loss of efficiency due to the use of outdated configurations. However, signaling to dynamically update CG parameters can consume valuable bandwidth resources and may result in inefficient resource usage or loss of reliability, within the interval between configuration signaling, so improvements are desired.

SUMMARY

Example embodiments of the present disclosure provide a method and apparatus for communication between a communication device, such an access point or a wireless transmitting station, and multiple wireless receiving stations or devices.

According to one example aspect, a method for semi-persistent scheduling (SPS) transmission is provided. The method, which is performed by a wireless device, includes the steps of: transmitting, to a user equipment, a radio resource control (RRC) signal comprising a time and frequency configuration for semi-persistent scheduling (SPS); and transmitting, to the user equipment, an information block via a physical downlink shared channel (PDSCH) configured based on the time and frequency configuration for SPS, the information block including signaling indicating at least one of: a modulation and coding scheme (MCS) for a subsequent transmission, a transmit power control command (TPC) for physical uplink control channel (PUCCH), PDSCH-to-HARQ feedback timing indicator, and PUCCH resource indicator. The method advantageously updates a set of parameters for a wireless channel in a dynamic and efficient manner. The SPS resource configuration can adapt to the dynamic nature of the wireless channel, and may also be used when a wireless channel is in an inactive state, where paging signal may be used. By indicating one or more of these parameters in a PDSCH transmission, these parameters can be configured with the same frequency as PDSCH transmissions to the UE, which may be more frequent than RRC signaling. For a UE receiving frequent PDSCH transmissions, it may be possible to reconfigure these parameters on a timeframe approaching that of dynamic GB signaling. This example embodiment may address the drawback of RRC signaling being too slow in terms of updating wireless channel parameters for a connection.

According to yet another aspect, there is an electronic electronic device having a transceiver for sending or receiving a wireless transmission, and a processing unit coupled to the transceiver, the processing unit being configured to execute instructions to: transmit, to a user equipment, a radio resource control (RRC) signal comprising a time and frequency configuration for semi-persistent scheduling (SPS); and transmit, to the user equipment, an information block via a physical downlink shared channel (PDSCH) configured based on the time and frequency configuration for SPS, the information block comprising signaling indicating at least one of: a modulation and coding scheme (MCS) for a subsequent transmission, a transmit power control command (TPC) for PUCCH, PDSCH-to-HARQ feedback timing indicator, and PUCCH resource indicator.

In some embodiments, the signaling is contained in a media access control (MAC) sub-header of the information block.

In some embodiments, the method may include, or the processing unit may be configured to perform: receiving a subsequent transmission configured based on the parameters sent in the information block.

In some embodiments, the method may include, or the processing unit may be configured to perform: sending a subsequent transmission configured based on the parameters sent in the information block.

In some embodiments, the information block may include signaling indicating at least one of the following parameters: frequency resource assignment, time domain resource assignment, virtual resource block (VRB)-to-physical resource block (PRB) mapping, PRB bundling size indicator, rate matching indictor, redundancy version, zero power (ZP) channel state information (CSI)-reference signals (RS) trigger to trigger aperiodic ZP CSI-RS, downlink assignment index, Service Request System (SRS) request, code block group (CBG) transmission information (CBGTI), CBG flushing out information (CBGFI), antenna ports, DeModulation Reference Signal (DMRS) sequence initialization, number of repetitions, periodicity, hybrid automatic repeat request (HARQ) ACK/NACK feedback, new-Radio Network Temporary Identifier (RNTI), periodicity, timedomain-Offset, nrofHARQ-Processes, MCS table, and downlink power offset.

In some embodiments, the MAC sub-header includes a subfield for physical uplink control channel (PUCCH), the PUCCH subfield including an index indicating a HARQ-ACK feedback.

In some embodiments, the MAC sub-header includes a subfield for physical downlink shared channel (PDSCH), the PDSCH subfield including a PDSCH-to-HARQ_feedback timing indicator.

In some embodiments, the PDSCH-to-HARQ_feedback timing indicator has a bit width determined based on a total number of entries in a parameter dl-DataToUL-ACK contained in the RCC signal.

In some embodiments, the MAC sub-header includes a subfield for a downlink assignment index (DAI), wherein the index has a bit width of 4 bits.

In some embodiments, the MAC sub-header includes a subfield for a downlink assignment index, wherein the index has a bit width of 2 bits.

In some embodiments, the TPC command for scheduled PUCCH has a bit width of 2 bits.

In some embodiments, the ZP CSI-RS trigger to trigger aperiodic ZP CSI-RS has a bit width of 2 bits.

In some embodiments, the higher layer signaling is the RCC signal.

In some embodiments, the SRS request has a bit width of 2 bits.

In some embodiments, the method may include, or the processing unit may be configured to perform: receiving a corresponding MAC control element (CE) confirmation.

In some embodiments, the signaling is contained in a specific time and frequency resource within the time and frequency region configured for SPS.

In some embodiments, the specific time and frequency resource is determined based on the RRC signal or a predefined rule.

In another aspect, a non-transitory machine readable storage medium is provided. The non-transitory machine readable storage medium includes a plurality of instructions adapted to be executed to implement a method for semi-persistent scheduling (SPS) configuration, the method including the steps of: transmitting, to a user equipment, a radio resource control (RRC) signal comprising a time and frequency configuration for semi-persistent scheduling (SPS); and transmitting, to the user equipment, an information block via a physical downlink shared channel (PDSCH) configured based on the time and frequency configuration for SPS, the information block comprising signaling indicating at least one of: a modulation and coding scheme (MCS) for a subsequent transmission, a transmit power control command (TPC) for PUCCH, PDSCH-to-HARQ feedback timing indicator, and PUCCH resource indicator.

In some embodiments, the signaling is contained in a media access control (MAC) sub-header of the information block.

In some embodiments, the method may include receiving a subsequent uplink transmission configured based on the parameters sent in the information block.

In some embodiments, the method may include sending a subsequent downlink transmission configured based on the parameters sent in the information block.

In some embodiments, the method may include receiving the corresponding MAC control element (CE) confirmation.

In some embodiments, the information block may include signaling indicating at least one of the following parameters: frequency resource assignment, time domain resource assignment, virtual resource block (VRB)-to-physical resource block (PRB) mapping, PRB bundling size indicator, rate matching indictor, redundancy version, zero power (ZP) channel state information (CSI)-reference signals (RS) trigger to trigger aperiodic ZP CSI-RS, downlink assignment index, Service Request System (SRS) request, code block group (CBG) transmission information (CBGTI), CBG flushing out information (CBGFI), antenna ports, DeModulation Reference Signal (DMRS) sequence initialization, number of repetitions, periodicity, hybrid automatic repeat request (HARQ) ACK/NACK feedback, new-Radio Network Temporary Identifier (RNTI), periodicity, timedomain-Offset, nrofHARQ-Processes, MCS table, and downlink power offset.

In some embodiments, the MAC sub-header includes a subfield for physical uplink control channel (PUCCH), the PUCCH subfield including an index indicating a HARQ-ACK feedback.

In some embodiments, the MAC sub-header includes a subfield for physical downlink shared channel (PDSCH), the PDSCH subfield including an a PDSCH-to-HARQ_feedback timing indicator.

In some embodiments, the PDSCH-to-HARQ_feedback timing indicator has a bit width determined based on a total number of entries in a parameter dl-DataToUL-ACK contained in the RCC signal.

In some embodiments, the MAC sub-header includes a subfield for a downlink assignment index (DAI), wherein the index has a bit width of 4 bits.

In some embodiments, the MAC sub-header includes a subfield for a downlink assignment index, wherein the index has a bit width of 2 bits.

In some embodiments, the TPC command for scheduled PUCCH has a bit width of 2 bits.

In some embodiments, the ZP CSI-RS trigger to trigger aperiodic ZP CSI-RS has a bit width of 2 bits.

In some embodiments, the higher layer signaling is the RCC signal.

In some embodiments, the SRS request has a bit width of 2 bits.

In some embodiments, the signaling is contained in a specific time and frequency resource within the time and frequency region configured for SPS.

In some embodiments, the specific time and frequency resource is determined based on the RRC signal or a predefined rule.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
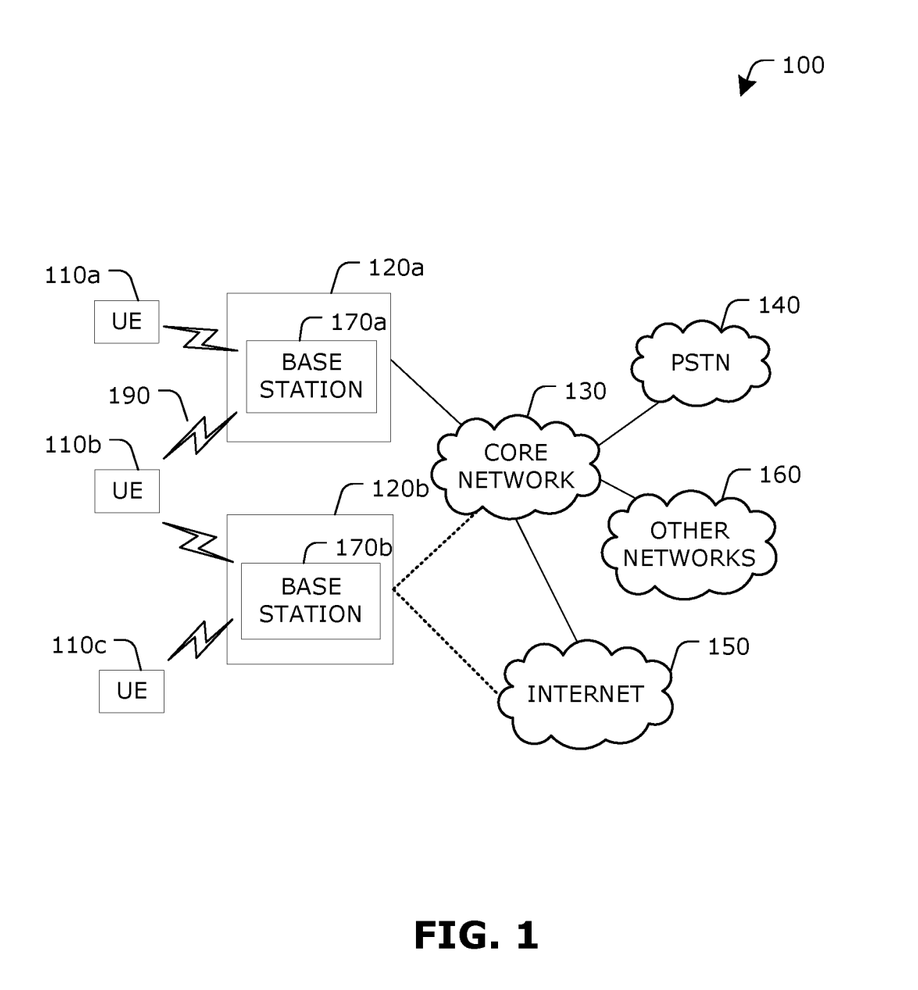
FIG. 1 is a schematic diagram of an example communication system suitable for implementing examples described herein.

FIG. 1 illustrates an example communication system 100 in which embodiments of the present disclosure could be implemented. In general, the communication system 100 enables multiple wireless or wired elements to communicate data and other content. The communication system 100 may enable content (e.g., voice, data, video, or text) to be communicated (e.g., via broadcast, narrowcast, or user device to user device) among entities of the system 100. The communication system 100 may operate by sharing resources such as bandwidth.

In this example, the communication system 100 includes user devices (ED) 110a-110c (which may be generically referred to as ED 110), radio access networks (RANs) 120a-120b (generically referred to as RAN 120), a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110 are configured to operate, communicate, or both, in the communication system 100. For example, the EDs 110 are configured to transmit, receive, or both via wireless or wired communication channels. Each ED 110 represents any suitable end user device for wireless operation and may include such devices (or may be referred to) as a user equipment or device (UE), a wireless transmitting or receiving unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, or a consumer electronics device, among other possibilities.

In FIG. 1, the RANs 120 include base stations (BS's) 170a,170b (which may be generically referred to as BS 170), respectively. Each BS 170a, 170b is configured to wirelessly interface with one or more of the EDs 110 to enable access to any other BS 170, the core network 130, the PSTN 140, the internet 150, or the other networks 160. For example, the BS 170s may include (or be) one or more of several well-known devices, such as a base transceiver station (BTS), a radio base station, a Node-B (NodeB), an evolved NodeB (eNodeB), a Home eNodeB, a gNodeB (sometimes called a "gigabit" Node B or a "gNB"), a transmission point (TP), a transmit and receive point (TRP), a site controller, an access point (AP), or a wireless router, among other possibilities. Any ED 110 may be alternatively or additionally configured to interface, access, or communicate with any other BS 170, the internet 150, the core network 130, the PSTN 140, the other networks 160, or any combination of the preceding. The communication system 100 may include RANs, such as RAN 120b, where the corresponding BS170b accesses the core network 130 via the internet 150, as shown.

The EDs 110 and BS's 170a, 170b are examples of communication equipment that can be configured to implement some or all of the functionality or embodiments described herein. In the embodiment shown in FIG. 1, the BS 170a forms part of the RAN 120a, which may include other BS's, base station controller(s) (BSC), radio network controller(s) (RNC), relay nodes, elements, or devices. Any BS 170a, 170b may be a single element, as shown, or multiple elements, distributed in the corresponding RAN, or otherwise. Also, the BS 170b forms part of the RAN 120b, which may include other BS's, elements, or devices. Each BS 170a, 170b transmits or receives wireless signals within a particular geographic region or area, sometimes referred to as a "cell" or "coverage area". A cell may be further divided into cell sectors, and a BS 170a, 170b may, for example, employ multiple transceivers to provide service to multiple sectors. In some embodiments, there may be established pico or femto cells where the radio access technology supports such. In some embodiments, multiple transceivers could be used for each cell, for example using multiple-input multiple-output (MIMO) technology. The number of RANs 120 shown is exemplary only. Any number of RANs may be contemplated when devising the communication system 100.

The BS's 170a, 170b communicate with one or more of the EDs 110 over one or more air interfaces 190 using wireless communication links (e.g. radio frequency (RF), microwave, or infrared). The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A BS 170a, 170b may implement Universal Mobile Telecommunication System (UMTS) Terrestrial Radio Access (UTRA) to establish an air interface 190 using wideband CDMA (WCDMA). In doing so, the BS 170a, 170b may implement protocols such as HSPA, HSPA+ optionally including HSDPA, HSUPA or both. Alternatively, BS 170a, 170b may establish an air interface 190 with Evolved UTMS Terrestrial Radio Access (E-UTRA) using LTE, LTE-A, or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120 are in communication with the core network 130 to provide the EDs 110 with various services such as voice, data, and other services. The RANs 120 or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120 or EDs 110 or both, and (ii) other networks (such as the PSTN 140, the internet 150, and the other networks 160). In addition, some or all of the EDs 110 may include functionality for communicating with different wireless networks over different wireless links using different wireless technologies or protocols. Instead of wireless communication (or in addition thereto), the EDs 110 may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110 may be multimode devices capable of operation according to multiple radio access technologies, and incorporate multiple transceivers necessary to support such.

Figure 2A:
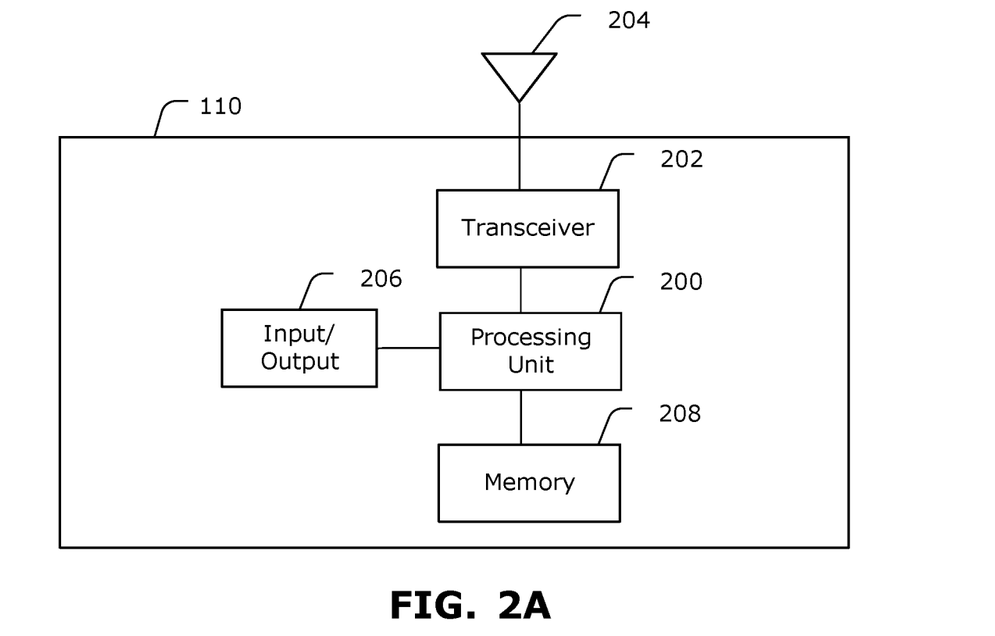
FIGS. 2A and 2B are block diagrams showing an example electronic device and an example base station, respectively, suitable for implementing examples described herein.
Figure 2B:
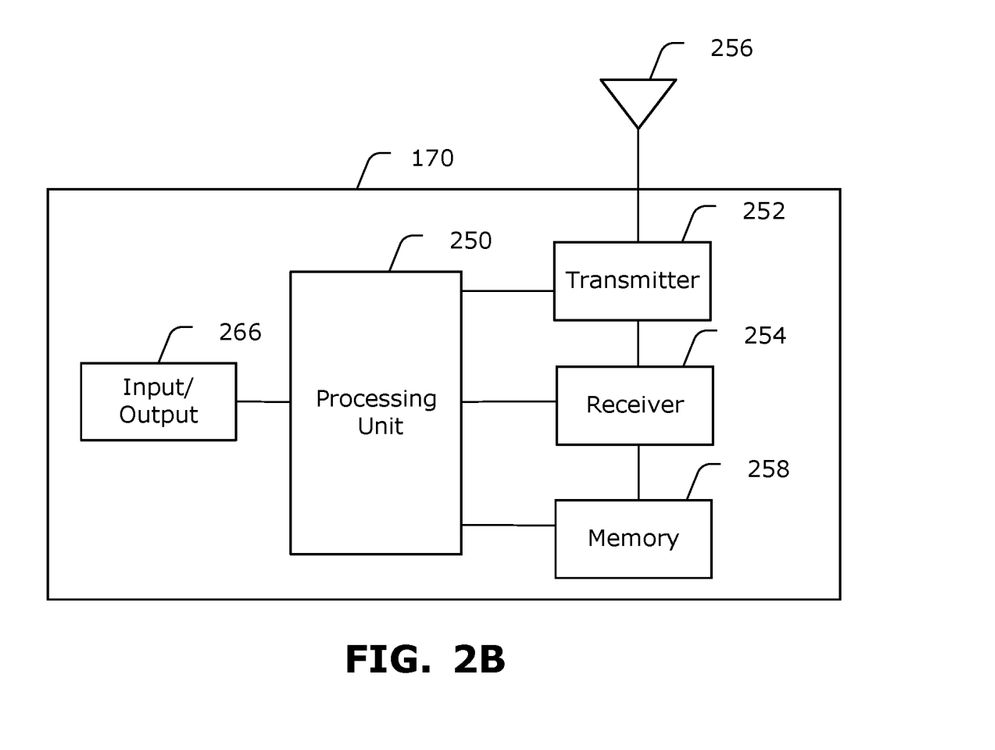

FIGS. 2A and 2B illustrate example devices that may implement the methods and teachings according to this disclosure. In particular, FIG. 2A illustrates an example ED 110, and FIG. 2B illustrates an example base station 170. These components could be used in the communication system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input or output processing, or any other functionality enabling the ED 110 to operate in the communication system 100. The processing unit 200 may also be configured to implement some or all of the functionality or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission or processing signals received wirelessly or by wire. Each antenna 204 includes any suitable structure for transmitting or receiving wireless or wired signals. One or multiple transceivers 202 could be used in the ED 110. One or multiple antennas 204 could be used in the ED 110. In some examples, one or more antennas 204 may be an array antenna 204, which may be used to perform beamforming and beam steering operations. Although shown as a single functional unit, a transceiver 202 could also be implemented using at least one transmitter and at least one separate receiver.

The ED 110 further includes one or more input or output devices 206 or input or output interfaces (such as a wired interface to the internet 150). The input or output device(s) 206 permit interaction with a user or other devices in the network. Each input or output device 206 includes any suitable structure for providing information to or receiving information from a user, such as a speaker, microphone, keypad, keyboard, display, or touchscreen, including network interface communications.

In addition, the ED 110 includes at least one memory 208. The memory 208 stores instructions and data used, generated, or collected by the ED 110. For example, the memory 208 could store software instructions or modules configured to implement some or all of the functionality or embodiments described herein and that are executed by the processing unit(s) 200. Each memory 208 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, at least one memory 258, and one or more input or output devices or interfaces 266. A scheduler 253 may be coupled to the processing unit 250. The scheduler 253 may be included within or operated separately from the base station 170. The processing unit 250 implements various processing operations of the base station 170, such as signal coding, data processing, power control, input or output processing, or any other functionality. The processing unit 250 can also be configured to implement some or all of the functionality or embodiments described herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs 110 or other devices. Each receiver 254 includes any suitable structure for processing signals received wirelessly or by wire from one or more EDs 110 or other devices. Although shown as separate components, at least one transmitter 252 and at least one receiver 254 could be combined into a transceiver. Each antenna 256 includes any suitable structure for transmitting or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an array antenna, which may be used for beamforming and beam steering operations. Each memory 258 includes any suitable volatile or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality or embodiments described herein and that are executed by the processing unit(s) 250.

Each input or output interface 266 permits interaction with a user or other devices in the network. Each input or output interface 266 includes any suitable structure for providing information to or receiving/providing information from a user, including network interface communications.

Referring back to FIG. 1, in an example, the ED 110 sends a communication to the BS 170 over the air interface 190, in a CG uplink (UL) transmission. Generally speaking, based on standards described in 3GPP TS38.331, the information element (IE) ConfiguredGrantConfig is used to configure uplink transmission without dynamic grant under one of two schemes. The actual uplink grant may either be configured via RRC (CG type 1) or provided by both DCI and RRC signaling (CG type 2). In the case of CG type 2, the DCI scrambled by Configured Scheduling (CS)-Radio Network Temporary Identifier (RNTI) is sent through physical downlink control channel (PDCCH). If DCI is used to transmit one or more CG communication parameters and indicate that the ED may perform uplink CG transmissions, the DCI is known as an activation DCI signal.

A CG UL transmission is an UL transmission (i.e., in the direction from the ED 110 to the BS 170) that is sent using UL resources configured by RRC signaling or by transmitting physical layer control information, such as activation DCI, to the ED 110 by the BS 170 for each data transmission. UL resources configured by scheduling activation PDCCH are activated by an activation DCI signal. A CG UL transmission does not need a dynamic and explicit scheduling grant from the BS 170. In some examples, the BS 170 may similarly send a SPS downlink (DL) transmission to the ED 110 over the air interface 190. A SPS DL transmission is a DL transmission (i.e., in the direction from the BS 170 to the ED 110) that is sent using resources for each transmission that are not explicitly scheduled using dynamic signaling. It should be understood that any of the embodiments disclosed herein can instead be performed as sidelink communications, in which case one UE would perform the actions described as being performed by the base station, in communication with a second UE.

CG transmissions are sometimes referred to as "grant-less transmissions", "schedule free transmissions", "schedule-less transmissions", or "configured grant transmissions" (in the sense that the resources used for each transmission are semi-statically configured or indicated by scheduling activation PDCCH but not dynamically scheduled).

In a CG UL transmission, different EDs 110 may send UL transmissions using UL time-frequency resources shared by the EDs 110, without specifically requesting use of the resources and without dynamic signaling From BS 170. In some cases, more than one ED 110 may be allocated the same designated resources for CG UL transmissions, in which case the CG UL transmissions are contention-based transmissions. Transmissions are contention-based if multiple EDs 110 are allocated the same resources, whether or not the resources are used by multiple EDs at the same time. CG UL transmissions may be suitable for transmitting bursty traffic with short packets from the ED 110 to the BS 170, or for transmitting data to the BS 170 in real-time or with low-latency, such as in the case of Ultra-Reliable Low Latency Communication (URLLC). An advantage of CG transmission is low latency resulting from not having to request and receive a dynamic grant for an allocated time slot from the BS 170. Furthermore, in a CG transmission, the scheduling overhead may be reduced.

The UL resources on which CG UL transmissions are sent may be referred to as "CG UL resources". The resources that may be used by the EDs 110 for CG UL transmission may be preconfigured, for example via using semi-static signaling, such as by radio resource control (RRC) signaling. The CG UL resources may be static or may be configured semi-statically. Semi-statically configured communication is sometimes referred to as SPS. A SPS configuration means the configuration is updated or changed on a relatively long time period, such as once in many frames or updated only as needed. A semi-static configuration differs from a dynamic configuration in that a semi-static configuration does not get updated or changed as often as a dynamic configuration. For example, a dynamic configuration may be updated or changed every subframe or slot, or every few subframes or slots (e.g., using dynamic signaling, such as downlink control information (DCI) signals), and a semi-static configuration may be updated or changed once every several frames, once every few seconds, or only if needed.

The EDs 110 may process and use the designated set of resources specified in the RRC or DCI signal to send their CG UL transmissions, but the BS 170 does not know which of the EDs 110, if any, are going to send a CG UL transmission, and using which of the designated resources.

To support CG transmissions, the associated resources configured for an ED 110 or a group of EDs 110 can include any, some or all of the following, including combinations thereof: frequency resources, time resources, reference signal (RS) or RS configuration, hopping parameters, hybrid automatic repeat request (HARQ) process IDs, modulation and coding schemes (MCSs), number of GF transmission repetitions, power control parameters, and other parameters, such as information associated with general grant-based data and control transmissions.

In an example, a physical resource block (PRB) scheme is provided by the RRC or DCI signaling. The PRB scheme may indicate a physical starting frequency resource block (RB) and size of the RB.

In another example, the RRC or DCI signaling may include time resources including starting or ending position of a data transmission time interval. Time resources can be one symbol, mini-slot, or slot.

In yet another example, each ED 110 can be configured with one or more reference signals (e.g. demodulation reference signals (DMRSs)) depending on scenarios involved. For a group of EDs 110, each ED 110 may or may not have a different RS or have a different set of RSs.

In one example, one or more hopping parameters specific to an ED 110 or group of EDs 110, which may include a hopping pattern cycle period (e.g., defined by a time period or by a number of hopping times), can be included in the RRC or DCI signaling. Other parameters in the CG UL transmissions may include a hopping pattern index or indices. Each ED 110 may have one or more hopping pattern indices.

In another example, the RRC or DCI signaling may include one or more hybrid automatic repeat request (HARQ) process IDs per ED 110.

In yet another example, the RRC or DCI signaling may include one or more modulation and coding schemes (MCSs) per ED 110. The ED 110 can indicate explicitly or implicitly which MCS to use for a CG transmission.

In one example, the RRC or DCI signaling may include a number of GF transmission repetitions, which may be represented by K. One or more K values can be configured for an ED 110. Which K value to use may depend on, for example, channel conditions, service types, and so on.

In another example, the RRC or DCI signaling may include power control parameters, including power ramping step size (e.g., for an ED 110).

In some embodiments, the RRC or DCI signaling may include information associated with general grant-based data and control transmissions.

In some embodiments, sending configuration parameters such as MCS and frequency resource allocation via RRC signaling is specific to CG.

Referring again to FIG. 1, in some embodiments, an ED 110 may operate in grant-based transmission mode and may have dedicated resources for making a contention-free scheduling request. When the scheduling request is received by the BS 170, the BS 170 transmits a grant to the ED 110 that grants uplink resources for the ED 110 to transmit data via a grant-based uplink transmission. In some embodiments, an ED 110 may send a contention-based scheduling request, e.g. as a configured grant uplink transmission, as described above. When the contention-based scheduling request is received by the BS 170, the BS 170 transmits a grant to the ED 110 that grants uplink resources for the ED 110 to transmit data via a grant-based uplink transmission.

Alternatively, in some embodiments, an ED 110 may send a configured grant uplink data transmission to the BS 170, via PUSCH. In response, the BS 170 may grant to uplink resources for the ED 110 to transmit additional data via a grant-based uplink transmission. The additional data may be a retransmission of the data in the configured grant uplink message. Alternatively, the additional data may be or include new data that the ED 110 has to transmit to BS 170, in which case the configured grant uplink transmission may include a buffer status report (BSR) indicating that the ED 110 has additional data to send.

In all of the different scenarios discussed in the paragraph above, the BS 170 sends a grant to the ED 110. In some embodiments, the grant may be a semi-persistent grant in the case of semi-persistent scheduling (SPS). A semi-persistent grant is a grant that schedules more than one transmission, e.g. a pattern of transmissions. As an example, a semi-persistent grant may grant a particular resource hopping pattern or particular reference signal hopping pattern for a set time or interval, or until the ED 110 receives further signaling. Generally speaking, SPS can be configured or re-configured by a RRC signal at any time using a SPS resource configuration message SPS-Config. SPS-Config may be referred to as an information element (IE) and includes the configuration for semiPersistSchedC-RNTI (sps-CRNTI), sps-ConfigDL and sps-ConfigUL. SPS can be configured in either or both UL and DL directions. SPS in the UL direction is sometimes known as configured grant type 2. In some embodiments, after configuration, SPS needs to be activated (e.g. via a subsequent DCI signal) by BS 170 for the ED 110 to start using SPS grants and assignments.

Under NR Release 15 (as specified in 3GPP TS38.331, and 3GPP TS38.321), the SPS-Config information element is used to configure downlink semi-persistent transmission. A BS 170 may, via RRC signaling, transmit one or more selected parameters in a SPS configuration message (e.g. SPS-config information element) for each SPS configuration, or in a Configured Grant (CG) message (e.g. ConfiguredGrantConfig information element) for each UL CG configuration. The selected parameters are generally related to the wireless channel. For example, when configured grant resource configurations are configured for an ED 110 via RRC signaling only (type 1) or by RRC plus physical layer control signaling such as DCI (type 2), the configuration information is provided by activation DCI sent through physical downlink control channel (PDCCH). Each CG resource configuration may have different parameter values. Each CG resource configuration may include a unique resource configuration index for the ED 110 in a cell or one network area with multiple cells. For example, each CG resource configuration transmission can include an MCS or frequency resource allocation.

There are several drawbacks with existing SPS resource configurations. For example, DL SPS in R15/R16 typically needs a DCI sent through PDCCH to activate SPS transmission. In a URLLC scenario, the DCI overhead for large numbers of UEs (e.g. 100 or more) can be significant.

In addition, in the case of SPS grant or assignment within a wireless channel that has highly dynamic characteristics, various channel parameters such as MCS, time or frequency domain resource allocation, and spatial allocation in SPS or CG may need to be updated dynamically based on channel conditions, which means that the channel parameters may need to be updated more quickly than the update schedule of a SPS configuration. This can lead to poor spectral efficiency. In some conventional cases, multiple CG or SPS configurations with different MCS, or different time and frequency resource domains may be reused to address the mismatch between SPS grant or assignment and the dynamically variable wireless channel, for example up to 8 or 12 configurations. However, it can increase complexity and cause potential delay and errors if an ED 110 has to blindly detect or decode potential data transmissions using multiple resource configurations even if only one data transmission is transmitted in a particular time slot.

There are multiple drawbacks with the current SPS scheduling scheme in existing technology. For example, current SPS parameters can be only updated by RRC signaling or via deactivated downlink control information (DCI), which adds overhead to the RRC or DCI signal. Moreover, channel parameters are updated via RRC signaling at a frequency on the order of every dozen or hundred milliseconds (ms), which can be less frequent than the rate at which the network channel may change.

In addition, 3GPP Release-16 (also known as "5G phase 2") proposes decreasing the small periodicity down to 1 slot for downlink (DL) SPS. Because the physical uplink control channel (PUCCH) carrying the hybrid automatic repeat request-acknowledgement (HARQ-ACK) feedback for SPS transmission is configured by RRC signaling, the RRC signaling must reserve a PUCCH resource in a semi static manner, even though there may not be any data transmission on the SPS resource configured in SPSconfig Information Element (IE). The reserved PUCCH resource may end up being unused, resulting in inefficiency, especially when the periodicity of SPS is as frequent as 1 slot or symbol level (e.g., 1, 2, 4, or 7 symbols).

Moreover, the HARQ-ACK feedback timing for SPS transmission is also configured by RRC signaling. In a Time Division Duplex (TDD) modulation scheme, if the periodicity of SPS is down to symbol or slot level, it can be difficult for a base station (e.g., a gNB) to ensure that the fixed HARQ-ACK feedback timing is accurate, because the HARQ-ACK feedback timing may not match the TDD frame structure, including DL or UL partition. For example, for a given TDD frame structure, the PUCCH feedback resource may be in the UL slot based on the HARQ-ACK feedback timing configured or indicated in the SPS activated DCI.

The current SPS mechanism does not support dynamic HARQ-ACK codebook for SPS transmission, and it is difficult to assign downlink assignment information (DAI) for SPS transmission in a dynamic manner. For example, since the HARQ-ACK feedback codebook is derived regardless of the actual physical downlink shared channel (PDSCH) scheduling, the HARQ-ACK feedback codebook is considered semi-static, which may lead to wasted HARQ-ACK feedback for SPS resources on which no meaningful data is transmitted.

The power control for HARQ-ACK feedback on PUCCH for SPS transmission is also considered semi-static. The power control parameters may not accurately describe the power transmission characteristics of the current wireless channel. The group common DCI format 2_2 can be used to dynamically indicate a power control value. However, the DCI format 2_2 is a group common DCI sent to the group of UEs. The power control fields that apply to the remaining UEs in the group may incur avoidable overhead, if any of the remaining UEs don't require power control signaling.

In conventional SPS transmission without dynamic grant, dynamic signaling (e.g., DCI) is not available to trigger aperiodic ZP CSI-RS on a one-shot basis, so dynamic channel state information is not available. Either RRC or activation DCI can trigger aperiodic ZP CSI-RS, however the triggering is not one-shot, and is limited to SPS configuration times.

Similar to triggering aperiodic ZP CSI-RS, dynamic signaling (e.g., DCI) is conventionally unavailable to trigger SRS transmission on a one-shot basis, so dynamic sounding information is not available. SPS activation DCI can be used to trigger SRS transmission, however it is limited to use during a valid, activated duration of SPS configuration.

Embodiments disclosed herein are implemented to address at least some of the drawbacks mentioned above. For example, SPS resource configuration in at least one embodiment below updates a set of parameters for a wireless channel in a dynamic and efficient way. The SPS resource configuration can adapt to the dynamic nature of the wireless channel, and may also be used when a wireless channel is in an inactive state, where paging signal may be used.

In some embodiments, HARQ-ACK PUCCH resource usage may be reduced, and the saved resources may be reconfigured as PUSCH resources, thereby increasing the system spectrum efficiency.

In some embodiments, flexible HARQ-ACK feedback timing may be implemented for SPS transmission, which may be particularly useful in TDD modulation scheme and with small periodicity of SPS.

In some embodiments, dynamic HARQ-ACK codebook for SPS transmission may be supported in TDD modulation scheme. DAI can indicate how many transmissions require HARQ feedback, and the HARQ-ACK codebook can be used to transmit only the number of HARQ bits required for HARQ feedback. The remaining bits that would conventionally be reserved for HARQ feedback can be used for data transmission, thereby achieving more efficient resource usage.

In some embodiments, UE-specific power control for PUCCH transmission for SPS is supported.

In some embodiments, triggering of SRS and ZP CSI-RS in a dynamic and one-shot manner is supported.

Figure 3:
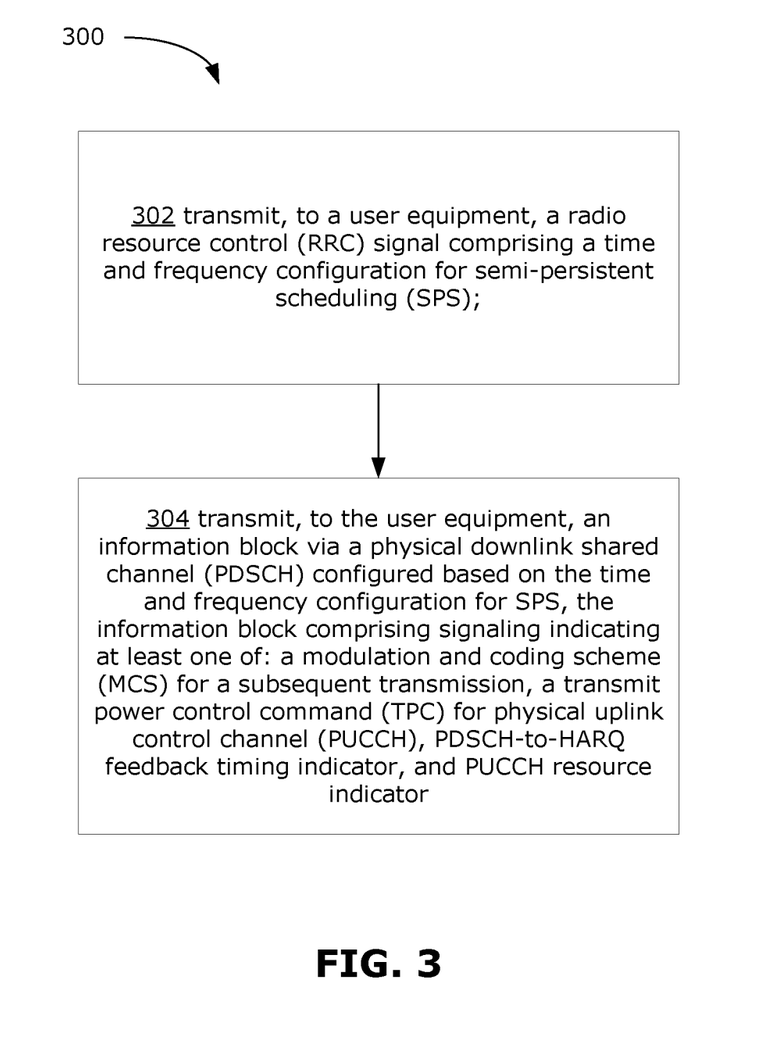
FIG. 3 is a flowchart illustrating an example method performed by a base station or end user equipment for a SPS configuration in accordance with an example embodiment.

FIG. 3 is a flowchart illustrating an example method 300 performed by a wireless communication device such as a BS 170, a gNB or a user equipment, to achieve a SPS configuration (e.g. a SPS resource configuration). Although described as being performed by a base station, it should be understood that the method 300 may instead be performed by a UE, for example in sidelink communication. At step 302, the BS 170 transmits, to one or more user equipment, a radio resource control (RRC) signal comprising a time and frequency configuration for semi-persistent scheduling (SPS). At step 304, the BS 170 transmits, to the one or more user equipment, a data block (sometimes known as an "information block") via a physical downlink shared channel (PDSCH) configured based on the time and frequency configuration for SPS, the data block comprising signals indicating at least one of the following parameters: a modulation and coding scheme (MCS) for a subsequent transmission, a transmit power control command (TPC) for physical uplink control channel (PUCCH), PDSCH-to-HARQ feedback timing indicator, and PUCCH resource indicator. These parameters are typically signaled using DCI, in grant-based frameworks that include DCI. By indicating one or more of these parameters in a PDSCH transmission, these parameters can optionally be configured with the same frequency as PDSCH transmissions to the UE, which may be more frequent than RRC signaling. For a UE receiving frequent PDSCH transmissions, it may be possible to reconfigure these parameters on a timeframe approaching that of dynamic GB signaling. This embodiment may address the previously mentioned drawback of RRC signaling being too slow in terms of updating wireless channel parameters for a connection.

In some embodiments, the data block further includes signals indicating at least one of the following parameters: frequency resource assignment, time domain resource assignment, virtual resource block (VRB)-to-physical resource block (PRB) mapping, PRB bundling size indicator, rate matching indictor, redundancy version, zero power (ZP) channel state information (CSI)-reference signals (RS) trigger to trigger aperiodic ZP CSI-RS, downlink assignment index, Service Request System (SRS) request, code block group (CBG) transmission information (CBGTI), CBG flushing out information (CBGFI), antenna ports, DeModulation Reference Signal (DMRS) sequence initialization, number of repetitions, periodicity, hybrid automatic repeat request (HARQ) ACK/NACK feedback, new-Radio Network Temporary Identifier (RNTI), periodicity, timedomain-Offset, nrofHARQ-Processes, MCS table, and downlink power offset. This embodiment may address previously mentioned drawback of RRC signaling being too slow in terms of updating wireless channel parameters for a connection.

In some embodiments, the signals may be contained in a media access control (MAC) sub-header portion of the data block transmitted via the PDSCH.

In an example embodiment, as mentioned, a MAC control element in a sub-header may be used to indicate one or more parameters listed above. The bit width for each parameter is fixed in the MAC control element and the maximum bit width for the control element can therefore be determined based on the respective bit width of each parameter included in the control element.

Figure 4:
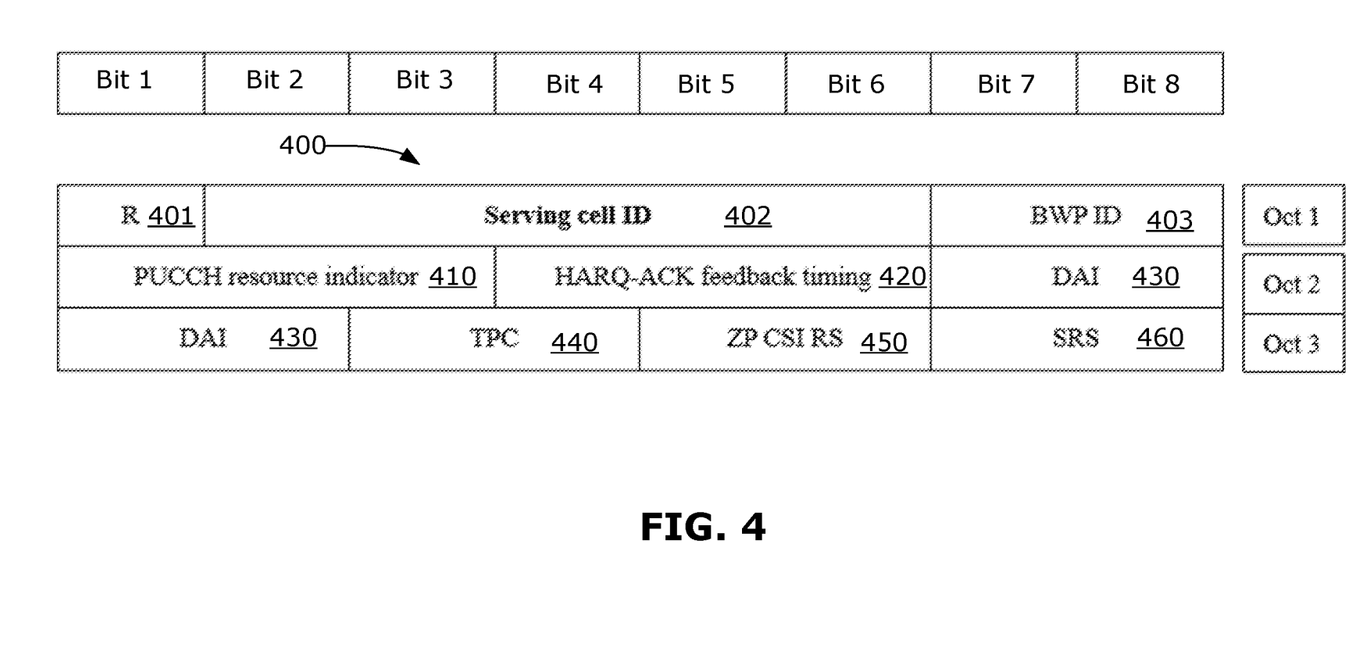
FIG. 4 shows an example MAC control element including one or more SPS parameters in accordance with at least one embodiment.

Referring now to FIG. 4, an example MAC control element (CE) 400 is shown, including multiple SPS parameters 401, 402, 403, 410, 420, 430, 440, 450, 460 in accordance with an embodiment. Other possible fields, and bit widths and arrangements of fields, in the MAC CE will be apparent to persons of skill in the art. Each parameter may have a respective size (bit width) ranging from 1 to 5 bits. A MAC CE 400 is a bit string that is byte aligned (i.e. multiple of 8 bits) in length. Note the order of the parameters as placed within the MAC CE 400 may vary. Each of the SPS parameters is further described below.

Reserved subfield 401 ("R") contains a reserved bit, generally set to "0" and occupying 1 bit.

Serving Cell ID subfield 402 contains a value indicating the identity of the Serving Cell for which the MAC CE 400 applies. The length of the field is 5 bits.

Bandwidth part (BWP) ID subfield 403 contains a value indicating a downlink bandwidth part (DL BWP) for which the MAC CE 400 applies. The length of the BWP ID subfield can be 2 bits.

PUCCH resource indicator subfield 410 contains a value indicating the PUCCH resource provided by PUCCH-ResourceId. PUCCH resource indicator subfield 410 can optionally include an index to indicate the presence of a HARQ-ACK feedback or lack thereof. The PUCCH resource indicator 410 subfield may be up to 3 bits, with the precise bit width determined by a number of entries in the higher layer parameter. The higher layer may be the RRC signal layer, for example.

A benefit of including PUCCH resource indicator 410 subfield in the MAC CE 400 is that HARQ feedback can be transmitted on the indicated PUCCH resource if the PUCCH resource is not needed. This results in more efficient usage of the resources reserved for PUCCH. No-HARQ-ACK in SPS PDSCH can dynamically indicate whether there is HARQ-ACK feedback to transmit in SPS PDSCH. No-HARQ-ACK can be indicated by one state of the PUCCH resource indicator or PDSCH-to-HARQ_feedback timing indicator, or can be indicated by a separate control information field.

PDSCH-to-HARQ_feedback timing indicator 420 subfield in the MAC CE 400 can have a bit width of 0, 1, 2, or 3 bits. The bit width for this field is determined as $\log_2 (I)$, where I is the number of entries in the higher layer parameter dl-DataToUL-ACK. The higher layer can be RRC signal layer, for example. This feature may enable the more frequent adjustment of HARQ feedback timing for SPS transmission, which may be particularly useful in TDD or for small periodicity of SPS.

Downlink assignment index (DAI) 430 subfield in the MAC CE 400 may have a bit width of 4 bits if more than one serving cell is configured in the downlink, and the higher layer parameter PDSCH-HARQ-ACK-Codebook is set to dynamic. In an example, the 2 most significant bits (MSB) bits are the counter DAI that indicates a sequential value or index for each SPS opportunity in the SPS interval that is used and therefore requires HARQ feedback. In an example, the 2 least significant bits (LSB) bits are the total DAI, which indicates the total number of SPS opportunities in a particular slot that are used and therefore require HARQ feedback. In some embodiments, DAI 430 subfield in the MAC CE 400 may have a bit width of 2 bits if only one serving cell is configured in the downlink and the higher layer parameter PDSCH-HARQ-ACK-Codebook is set to dynamic, where the 2 bits are the counter DAI. This feature may address the previously mentioned drawback regarding HARQ-ACK codebook for SPS transmission in TDD, and achieve better HARQ-ACK performance thru eliminating the transmission of meaningless HARQ-ACKs for a given PUCCH resource.

Transmit power control (TPC) command 440 subfield in MAC CE 400 is typically set for a scheduled PUCCH. The TPC command 440 subfield can be 2 bits. This feature may address the previously mentioned drawback regarding PUCCH reliability.

ZP CSI-RS trigger to trigger aperiodic ZP CSI-RS 450 subfield in MAC CE 400 can have a bit width of 0, 1, or 2 bits, as defined in Subclause 5.1.4.2 of 3GPP TS 38.214. The bit width for this field may be determined as $\log_2 (n_{zp}+1)$ bits where $n_{zp}$ is the number of aperiodic ZP CSI-RS resource sets configured by a higher layer such as RRC signal layer. This feature can support triggering of Aperiodic ZP CSI-RS in a dynamic and one-shot manner.

Service Request System (SRS) request 460 subfield in MAC CE 400 can have a bit width of 2 bits. This feature can support triggering of SRS request in a dynamic and one-shot manner.

Figure 5:
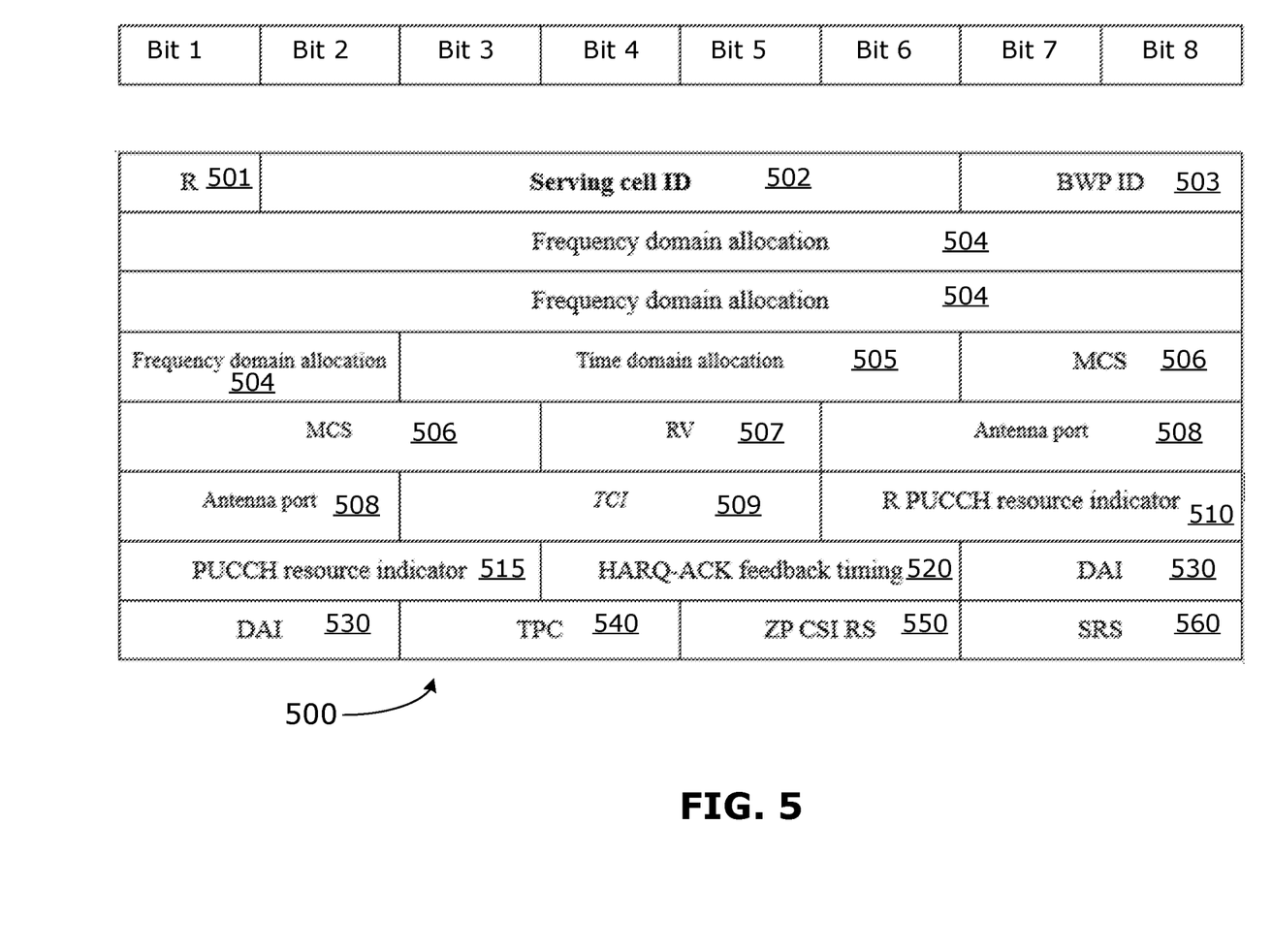
FIG. 5 shows another example MAC control element including one or more SPS parameters in accordance with at least one embodiment.

FIG. 5 shows another example MAC control element (CE) 500 including one or more SPS parameters 501, 502, 503, 504, 505, 506, 507, 508, 509, 510, 515, 520, 530, 540, 550, 560 in accordance with at least one embodiment. Note the order of the parameters as placed within the MAC CE 500 may vary, as well as the bit widths. Other subfields or parameters may be present instead of or in addition to the fields described.

Reserved subfield 501 ("R") contains a reserved bit, generally set to "0" and occupying 1 bit.

Serving Cell ID subfield 502 contains a value indicating the identity of the Serving Cell for which the MAC CE 500 applies. The length of the field is 5 bits.

BWP ID subfield 503 contains a value indicating a DL BWP for which the MAC CE 500 applies. The length of the BWP ID subfield can be 2 bits.

Frequency domain allocation (or frequencyDomainAllocation) subfield 504 contains a value indicating the frequency domain resource allocation (see e.g. TS 38.214, clause 6.1.2, and TS 38.212, clause 7.3.1). In some embodiments, the length of the frequenyDomianAllocation subfield 504 can be fixed to a pre-determined value, for example 13 bits. In some embodiments, the length of the frequenyDomianAllocation subfield 504 can be a value ranging from 5 to 25 bits.

Time domain allocation (or timeDomainAllocation) subfield 505 contains a value indicating a combination of start symbol, length and PDSCH mapping type (see e.g. TS 38.214 [19], clause 6.1.2 and TS 38.212 [17], clause 7.3.1). In some embodiments, the length of the TimeDomianAllocation subfield 505 can be fixed to be one value, for example 4 bits. In some embodiments, the length of the TimeDomianAllocation subfield 505 can be a value ranging from 0 to 4 bits.

Modulation and coding scheme (MCS) subfield 506 contains values indicating a MCS for a subsequent transmission. In some embodiments, the bit width of this subfield may be set to up to 5 bits.

Redundancy version (RV) subfield 507 contains values indicating a redundancy version for a transmission. In some embodiments, the bit width of this subfield may be set to up to 2 bits.

Antenna port (or antennaPort) subfield 508 contains a value indicating the antenna ports to be used for this configuration, and the maximum bit width can be set to a pre-determined value, such as 5 bits (see e.g. TS 38.214 [19], clause 6.1.2, and TS 38.212 [17], clause 7.3.1).

Transmission Configuration Indicator (TCI) subfield 509 contains a value representing a specific TCI state ID. In some embodiments, up to 8 TCI states may be activated. A TCI State table (e.g. 'tci-StatesToAddModList') is defined in PDSCH-Config, which may be used to help specify the specific TCI state based on the value representing the specific TCI state ID.

PUCCH resource indicator 510 subfield contains a value indicating the PUCCH resource provided by PUCCH-ResourceId. PUCCH resource indicator 510 can optionally include an index to indicate the presence of a HARQ-ACK feedback or lack thereof. The PUCCH resource indicator 510 subfield may be up to 3 bits, with the precise bit width determined by how many SPS resources are configured. The higher layer may be the RRC signal layer, for example.

PDSCH-to-HARQ_feedback timing indicator 520 subfield in the MAC CE 500 can have a bit width of 0, 1, 2, or 3 bits. The bit width for this field is determined as $\log_2 (I)$, where I is the number of entries in the higher layer parameter dl-DataToUL-ACK. The higher layer can be RRC signal layer, for example.

Downlink assignment index (DAI) 530 subfield in the MAC CE 500 may have a bit width of 4 bits if more than one serving cell is configured in the downlink, and the higher layer parameter PDSCH-HARQ-ACK-Codebook is set to dynamic, where the 2 most significant bits (MSB) bits are the counter DAI and the 2 least significant bits (LSB) bits are the total DAI. In some embodiments, DAI 530 subfield in the MAC CE 500 may have a bit width of 2 bits if only one serving cell is configured in the downlink and the higher layer parameter PDSCH-HARQ-ACK-Codebook is set to dynamic, where the 2 bits are the counter DAI.

Transmit power control (TPC) command 540 subfield in MAC CE 500 is typically set for a scheduled PUCCH. The TPC command 540 subfield can be 2 bits.

ZP CSI-RS trigger to trigger aperiodic ZP CSI-RS 550 subfield in MAC CE 550 can have a bit width of 0, 1, or 2 bits, as defined in Subclause 5.1.4.2 of 3GPP TS 38.214. The bit width for this field may be determined as $\log_2 (n_{zp}+1)$ bits where $n_{zp}$ is the number of aperiodic ZP CSI-RS resource sets configured by a higher layer such as RRC signal layer.

Service Request System (SRS) request 560 subfield in MAC CE 500 can have a bit width of 2 bits. This feature can support triggering of SRS request in a dynamic and one-shot manner.

Figure 6:
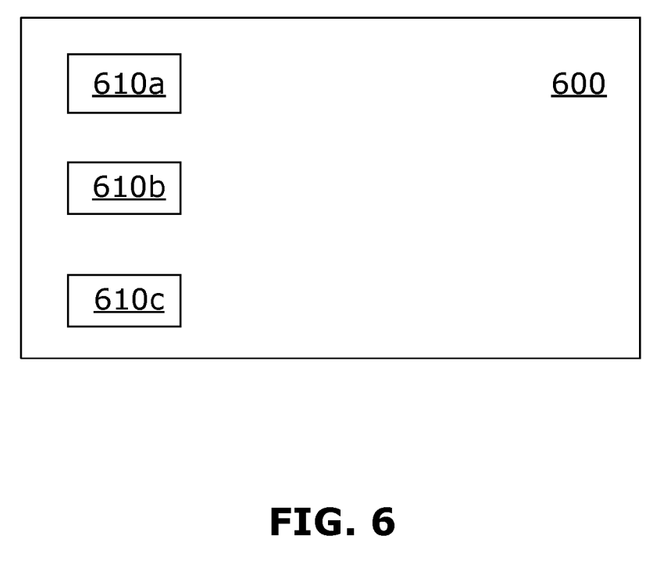
FIG. 6 is a schematic diagram showing a SPS configured resource including one or more SPS parameters in accordance with at least one embodiment.

FIG. 6 is a schematic diagram showing a SPS configured resource 600 including one or more SPS parameters in accordance with at least one embodiment. A similar configuration could be applied to a CG configured resource. In this example embodiment, the SPS configured resource 600 may be contained an information block via a physical downlink shared channel (PDSCH) configured based on the time and frequency configuration for SPS.

One or more specific portions 610a, 610b, 610c of the SPS configured resource 600 may be a particular physical resource block (PRB) or symbol, and may be configured to carry any one or more of the above mentioned parameters, including for example one of SPS parameters 401, 402, 403, 410, 420, 430, 440, 450, 460, 501, 502, 503, 504, 505, 506, 507, 508, 509, 510, 515, 520, 530, 540, 550, 560 described in connection with FIG. 4 or 5. These specific resources can be indicated by RRC signaling, in the SPS or CG configuration. These resources may alternatively be indicated by activation DCI.

The SPS configured resource 600 can be contiguous or non-contiguous. In some embodiments, the SPS configured resource 600 can be derived from a set of predefined rules or formulations, or determined based on signaling information from SPSconfig IE or other DCI signaling, in order to make both sides have the same understanding on the specific resource.

In some embodiments, the method may include receiving a corresponding MAC control element (CE) confirmation, to confirm that the PDSCH indicating communication parameters was correctly received, and that the updated parameters indicated in the PDSCH will take effect immediately.

In some embodiments, the method may include receiving a HARQ-ACK feedback message in a PUCCH transmission for the PDSCH that carries at least one of the following parameters: an MCS for a subsequent transmission, a TPC for a PUCCH, PDSCH-to-HARQ feedback timing indicator, and PUCCH resource indicator. The PUCCH resource may be indicated by a PUCCH resource indicator carried in the PDSCH. Alternatively, the PUCCH resource can be determined from the RRC configuration or following a predefined rule.

In some embodiments, the method may be configured to skip the corresponding HARQ-ACK feedback for the PDSCH according to at least one of the parameter carried in the said PDSCH.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method performed by a wireless device, the method comprising:
   transmitting, to a user equipment, a radio resource control (RRC) signal specifying a time and frequency configuration for semi-persistent scheduling (SPS); and
   transmitting, to the user equipment, an information block via a physical downlink shared channel (PDSCH), wherein the information block is transmitted to the user equipment directly without and independent of downlink control information (DCI), the information block configured based on the time and frequency configuration for SPS specified by the RRC signal, the information block specifying signaling parameters comprising a modulation and coding scheme (MCS) table parameter specifying a MCS table and a downlink power offset for use in a subsequent transmission and hybrid automatic repeat request (HARQ) ACK/NACK feedback;
   wherein:
      the signaling parameters are contained in a specific time and frequency resource portion of a time and frequency region of the information block, the specific time and frequency resource portion being dependent on the RRC signal;
      wherein the signaling parameters are contained in a media access control (MAC) sub-header of the information block;
      wherein the MAC sub-header includes a subfield for a downlink assignment index (DAI);
      wherein the RRC signal supports a dynamic HARQ-ACK codebook for SPS transmission in a Time Division Duplex (TDD) modulation scheme;
      wherein the RRC signal configures a HARQ-ACK feedback timing;
      wherein the DAI of MAC sub-header comprises a number of bits specifying a number of HARQ bits required for HARQ feedback indicated by the DAI and the remaining bits are used for data transmission.

2. The method of claim 1, further comprising receiving a subsequent transmission configured based on the signaling parameters sent in the information block.

3. The method of claim 1, further comprising sending a subsequent transmission configured based on the signaling parameters sent in the information block.

4. The method of claim 1, wherein the information block further comprises at least one of the following signaling parameters: frequency resource assignment, time domain resource assignment, virtual resource block (VRB)-to-physical resource block (PRB) mapping, PRB bundling size indicator, rate matching indictor, redundancy version, zero power (ZP) channel state information (CSI)-reference signals (RS) trigger to trigger aperiodic ZP CSI-RS, downlink assignment index, Service Request System (SRS) request, code block group (CBG) transmission information (CBGTI), CBG flushing out information (CBGFI), antenna ports, DeModulation Reference Signal (DMRS) sequence initialization, number of repetitions, periodicity, new-Radio Network Temporary Identifier (RNTI), periodicity, time-domain Offset, and nrofHARQ-Processes.

5. The method of claim 1, wherein the MAC sub-header includes a subfield for physical uplink control channel (PUCCH), the PUCCH subfield including an index indicating a HARQ-ACK feedback.

6. The method of claim 1, wherein the MAC sub-header includes a subfield for physical downlink shared channel (PDSCH), the PDSCH subfield including a PDSCH-to-HARQ_feedback timing indicator.

7. The method of claim 6, wherein the PDSCH-to-HARQ_feedback timing indicator has a bit width determined based on a total number of entries in a parameter dl-DataToUL-ACK contained in the RRC signal.

8. The method of claim 1, wherein the DAI has a bit width of 2 or 4 bits.

9. The method of claim 1, wherein the TPC command for scheduled PUCCH has a bit width of 2 bits.

10. The method of claim 4, wherein the ZP CSI-RS trigger to trigger aperiodic ZP CSI-RS has a bit width of 2 bits.

11. The method of claim 4, wherein the SRS request has a bit width of 2 bits.

12. The method of claim 1, further comprising receiving a corresponding MAC control element (CE) confirmation.

13. The method of claim 1, wherein the information block further specifies one or more following signaling parameters: a transmit power control command (TPC) for physical uplink control channel (PUCCH), PDSCH-to-HARQ feedback timing indicator, and PUCCH resource indicator.

14. An electronic device comprising:
   a transceiver for sending or receiving a wireless transmission; and
   a processing unit coupled to the transceiver, the processing unit being configured to execute instructions to:
   transmit, to a user equipment, a radio resource control (RRC) signal specifying a time and frequency configuration for semi-persistent scheduling (SPS); and
   transmit, to the user equipment, an information block via a physical downlink shared channel (PDSCH), wherein the information block is transmitted to the user equipment directly without and independent of downlink control information (DCI), the information block configured based on the time and frequency configuration for SPS specified by the RRC signal, the information block specifying signaling parameters comprising a modulation and coding scheme (MCS) table parameter specifying a MCS table and a downlink power offset for use in a subsequent transmission and hybrid automatic repeat request (HARQ) ACK/NACK feedback;
   wherein:
      the signaling parameters are contained in a specific time and frequency resource portion of a time and frequency region of the information block, the specific time and frequency resource portion being dependent on the RRC signal;
      wherein the signaling parameters are contained in a media access control (MAC) sub-header of the information block;
      wherein the MAC sub-header includes a subfield for a downlink assignment index (DAI); wherein the RRC signal supports a dynamic HARQ-ACK codebook for SPS transmission in a Time Division Duplex (TDD) modulation scheme;
      wherein the RRC signal configures a HARQ-ACK feedback timing;
      wherein the DAI of MAC sub-header comprises a number of bits specifying a number of HARQ bits required for HARQ feedback indicated by the DAI and the remaining bits are used for data transmission.

15. The electronic device of claim 14, wherein the processing unit is further configured to receive a subsequent uplink transmission configured based on the signaling parameters sent in the information block.

16. The electronic device of claim 14, wherein the processing unit is further configured to send a subsequent downlink transmission configured based on the signaling parameters sent in the information block.

17. The electronic device of claim 14, wherein the information block further comprises at least one of the following signaling parameters: frequency resource assignment, time domain resource assignment, virtual resource block (VRB)-to-physical resource block (PRB) mapping, PRB bundling size indicator, rate matching indictor, redundancy version, zero power (ZP) channel state information (CSI)-reference signals (RS) trigger to trigger aperiodic ZP CSI-RS, downlink assignment index, Service Request System (SRS) request, code block group (CBG) transmission information (CBGTI), CBG flushing out information (CBGFI), antenna ports, DeModulation Reference Signal (DMRS) sequence initialization, number of repetitions, periodicity, new-Radio Network Temporary Identifier (RNTI), periodicity, time-domain Offset, and nrofHARQ-Processes.

18. The electronic device of claim 14, wherein the MAC sub-header includes a subfield for physical uplink control channel (PUCCH), the PUCCH subfield including an index indicating a HARQ-ACK feedback.

19. The electronic device of claim 14, wherein the MAC sub-header includes a subfield for physical downlink shared channel (PDSCH), the PDSCH subfield including a PDSCH-to-HARQ_feedback timing indicator.

20. The electronic device of claim 19, wherein the PDSCH-to-HARQ_feedback timing indicator has a bit width determined based on a total number of entries in a parameter dl-DataToUL-ACK contained in the RRC signal.

21. The electronic device of claim 14, wherein the DAI has a bit width of 2 or 4 bits.

22. The electronic device of claim 14, wherein the TPC command for scheduled PUCCH has a bit width of 2 bits.

23. A non-transitory machine readable storage medium comprising a plurality of instructions adapted to be executed to implement a method for semi-persistent scheduling (SPS) configuration, the method comprising:
   transmitting, to a user equipment, a radio resource control (RRC) signal specifying a time and frequency configuration for semi-persistent scheduling (SPS); and
   transmitting, to the user equipment, an information block via a physical downlink shared channel (PDSCH), wherein the information block is transmitted to the user equipment directly without and independent of downlink control information (DCI), the information block configured based on the time and frequency configuration for SPS specified by the RRC signal, the information block specifying signaling parameters comprising a modulation and coding scheme (MCS) table parameter specifying a MCS table and a downlink power offset for use in a subsequent transmission and hybrid automatic repeat request (HARQ) ACK/NACK feedback;
   wherein; the signaling parameters are contained in a specific time and frequency resource portion of a time and frequency region of the information block, the specific time and frequency resource portion being dependent on the RRC signal;
   wherein the signaling parameters are contained in a media access control (MAC) sub-header of the information block;
   wherein the MAC sub-header includes a subfield for a downlink assignment index (DAI); wherein the RRC signal supports a dynamic HARQ-ACK codebook for SPS transmission in a Time Division Duplex (TDD) modulation scheme;
   wherein the RRC signal configures a HARQ-ACK feedback timing;
   wherein the DAI of MAC sub-header comprises a number of bits specifying a number of HARQ bits required for HARQ feedback indicated by the DAI and the remaining bits are used for data transmission.

\* \* \* \* \*